(12) United States Patent
Sodhi et al.

(10) Patent No.: US 9,250,901 B2
(45) Date of Patent: Feb. 2, 2016

(54) EXECUTION CONTEXT SWAP BETWEEN HETEROGENEOUS FUNCTIONAL HARDWARE UNITS

(71) Applicants: Inder M. Sodhi, Folsom, CA (US); Marc Torrant, Sacramento, CA (US); Zeev Offen, Folsom, CA (US); Michael Mishaeli, Zichron Yaakov (IL); Ashish V. Choubal, Austin, TX (US); Jason W. Brandt, Austin, TX (US)

(72) Inventors: Inder M. Sodhi, Folsom, CA (US); Marc Torrant, Sacramento, CA (US); Zeev Offen, Folsom, CA (US); Michael Mishaeli, Zichron Yaakov (IL); Ashish V. Choubal, Austin, TX (US); Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 395 days.

(21) Appl. No.: 13/795,338

(22) Filed: Mar. 12, 2013

(65) Prior Publication Data

US 2014/0281380 A1     Sep. 18, 2014

(51) Int. Cl.
   *G06F 9/30*     (2006.01)
   *G06F 9/38*     (2006.01)
   *G06F 1/32*     (2006.01)
   *G06F 9/46*     (2006.01)

(52) U.S. Cl.
   CPC .............. *G06F 9/30123* (2013.01); *G06F 1/32* (2013.01); *G06F 9/3836* (2013.01); *G06F 9/461* (2013.01)

(58) Field of Classification Search
   None
   See application file for complete search history.

(56) References Cited

U.S. PATENT DOCUMENTS

| 2010/0146513 A1* | 6/2010 | Song | G06F 1/3203 718/104 |
| 2012/0278637 A1* | 11/2012 | Hsin | G06F 1/3203 713/300 |
| 2014/0229943 A1* | 8/2014 | Tian | G06F 9/45533 718/1 |

* cited by examiner

*Primary Examiner* — William B Partridge
(74) *Attorney, Agent, or Firm* — Lowenstein Sandler LLP

(57) ABSTRACT

Remapping technologies for execution context swap between heterogeneous functional hardware units are described. A computing system includes multiple registers configured to store remote contexts of functional units. A mapping table maps the remote context to the functional units. An execution unit is configured to execute a remapping tool that intercepts an operation to access a remote context of a first functional unit of the plurality of functional units that is taken offline. The remapping tool determines that the first functional unit is remapped to a second functional unit using the mapping table. The operation is performed to access the remote context that is remapped to the second functional unit. The first functional unit and the second functional unit may be heterogeneous functional units.

25 Claims, 11 Drawing Sheets

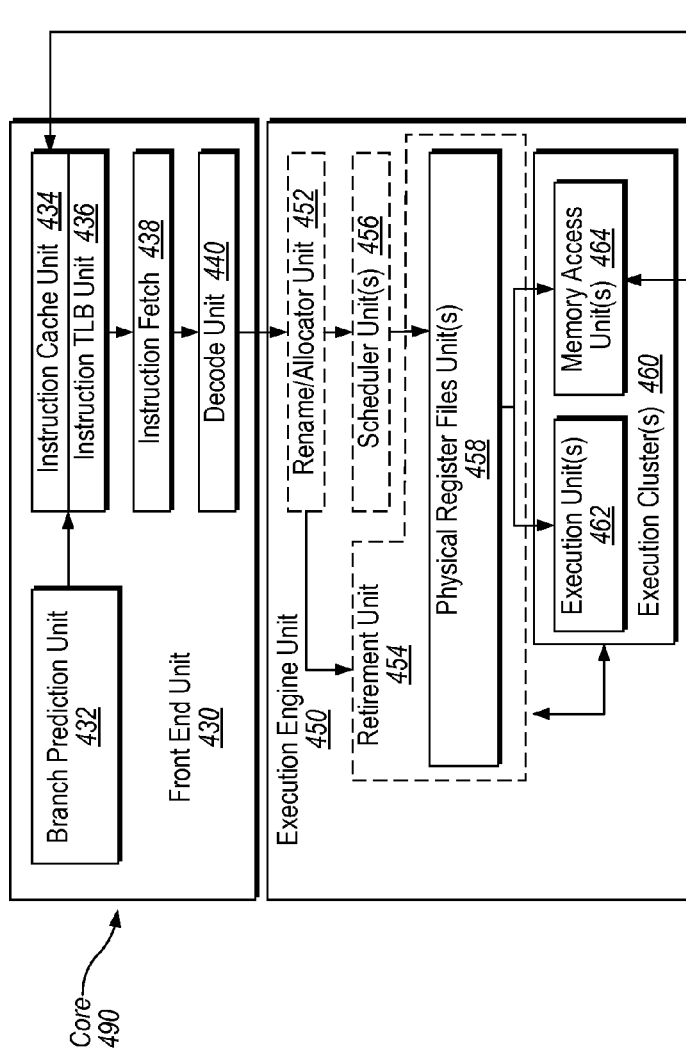
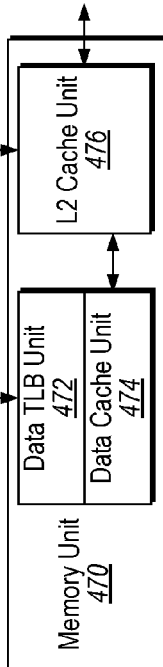
FIG. 4A
FIG. 4B

EXECUTION CONTEXT SWAP BETWEEN HETEROGENEOUS FUNCTIONAL HARDWARE UNITS

Embodiments described herein generally relate to processing devices and, more specifically, relate to content swaps between heterogeneous functional hardware units.

BACKGROUND

Modern processors include multiple instances of processor cores that can be turned on or off independently as directed by a Power Management Unit (execution unit). A multi-core processor, for example, is a single computing component with two or more independent actual central processing units (also referred to as "logical processor," "cores" or "processor cores"), which are the units that read and execute program instructions. The instructions are typically CPU instructions, but multiple cores can run multiple instructions at the same time, increasing overall speed for programs amenable to parallel computing. Manufacturers typically integrate the cores onto an integrated circuit die, or onto multiple dies in a single package. Homogenous multi-core systems include only identical cores, and heterogeneous multi-core systems have cores that are not identical.

BRIEF DESCRIPTION OF THE DRAWINGS

FIG. 4A illustrates elements of a processor micro-architecture according to one embodiment.

FIG. 4B illustrates elements of a processor micro-architecture according to one embodiment.

DESCRIPTION OF EMBODIMENTS

Figure 1:
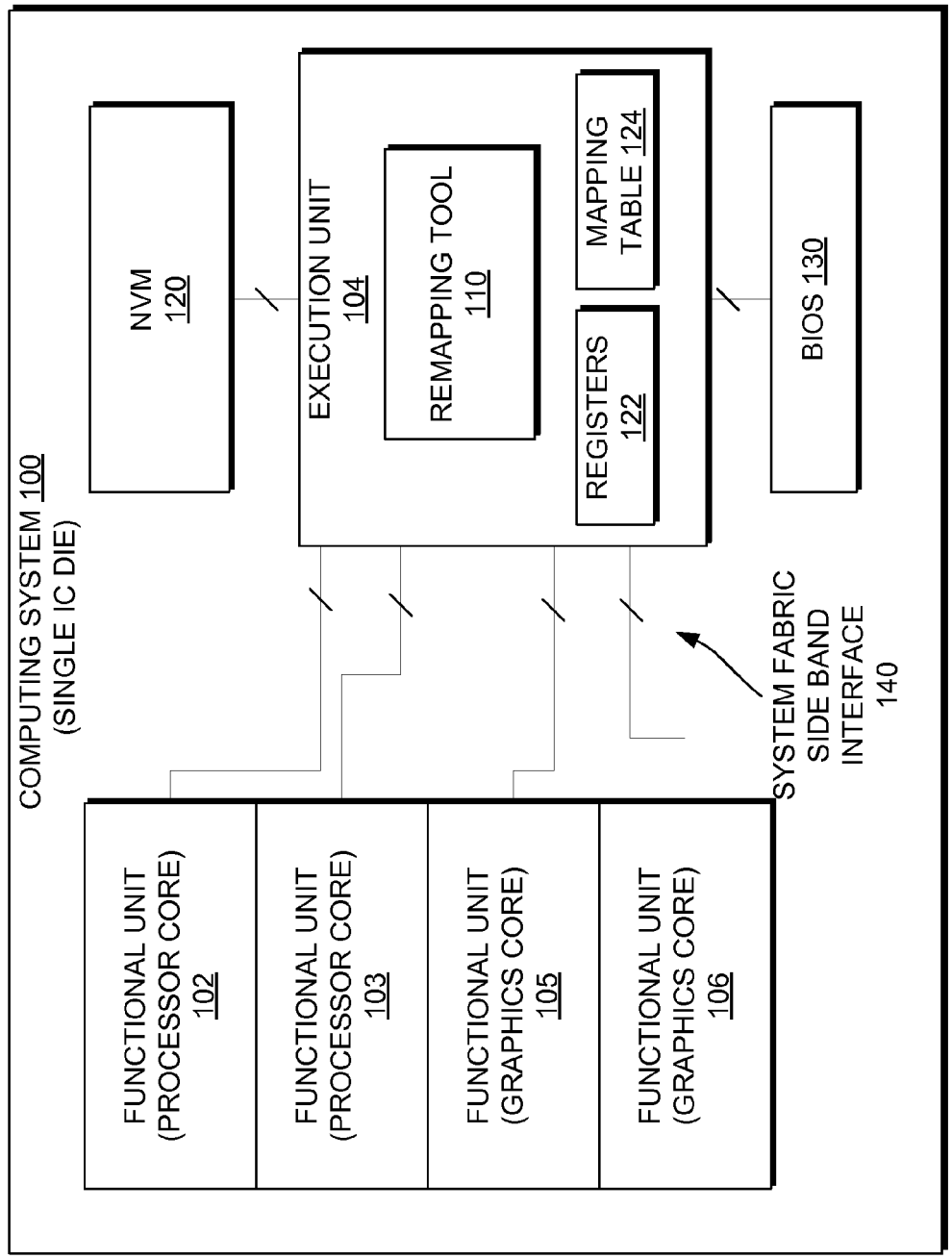
FIG. 1 is a block diagram of a computing system that implements a remapping tool for multiple functional hardware units of an integrated circuit die according to one embodiment.

Embodiments of the disclosure provide for heterogeneous functional hardware unit context remapping. In one embodiment, a computing system includes registers configured to store remote contexts of functional hardware units (referred to herein as functional units) of the computing system, a mapping table that maps the remote contexts to the functional units, and an execution unit configured to execute a remapping tool. Remote contexts, as described herein, refer to the non-migrated context (or state) of a functional unit (e.g., core) which is being migrated and powered down (also referred to as taken offline). Some of the remote context may be replicated for each physical core. Thus, accesses to it from the post-migration physical core should not access the same data/context as it would have on the pre-migration physical core. This is the physically-accessed state as described herein. Some of the remote context may be linked to a virtual core and needs to be either migrated or remapped so that it can still be accessible by the migrated or remapped core. This is the logically-addressed state described herein. The remapping tool may intercept all operations to the remote context of the core that is taken offline. For example, the remapping tool may intercept an operation to access a remote context of a first functional unit that is taken offline. The remapping tool determines that the first functional unit is remapped to a second functional unit using the mapping table. The remapping tool may cause the operation to be performed to access the remote context that is remapped to the second functional unit. The first and second functional units may be heterogeneous functional units (e.g., heterogeneous cores).

In modern multi-core CPU environments, the contexts (also referred to as states) of the cores are stored in processor registers or memory. A context switch is the process of storing and restoring the context of a core, a thread or a task so that execution can be resumed from the same point at a later time by the same core or by a different core. Software-based context switches are usually computationally intensive and may differ for different types of operating systems. For example, switching from one thread to another requires a certain amount of time for saving and loading registers and memory maps, updating various tables and lists, or the like. When a core is taken offline, the context of the core is lost or a copy of the context needs to be made to retain the context. For example, operating system-directed configuration and Power Management (OSPM) regularly takes cores, such as processing threads, offline in an attempt to load balance a machine.

As described above, software-based context switches are usually computationally intensive and may differ for different types of operating systems. The embodiments of the disclosure allows for software-aware and software-agnostic context migration. The embodiments of the disclosure may allow for a reduction in the number of state elements in a heterogeneous core setup in which an offline core does not need a copy of the context state. The embodiments of the disclosure may provide "off-core" context remapping regardless of the different types of operating systems. The embodiments of the disclosure may be used to dynamically switch between logically-accessed states or physically-accessed states, or both. The embodiments of the disclosure may allow a remapping of a computing core's remote context (off-core context) in order to make a heterogeneous-replaced core look like it is still available. An example of remote context that may be affected are residency timers used by software (e.g., operation system or an application executing on the operating system) to determine what operating state (e.g., C-state) to use. The embodiments of the disclosure may allow software-agnostic context migration without making a copy of the remote context of the functional unit that is taken offline.

FIG. 1 is a block diagram of one embodiment of a computing system 100 that implements a remapping tool 110 for multiple functional hardware units 102, 103, 105, 106 of an integrated circuit die. In one embodiment, the computing system 100 is integrated in an integrated circuit die having multiple functional hardware units 102, 103, 105, 106 (hereafter referred to as a multi-core system). In another embodiment, the computing system 100 is integrated into multiple dies in a single package. The multi-core system may be a multi-core processor package, but may include other types of functional units than just processor cores.

Functional hardware units may be processor cores (e.g., 102 or 103), graphics cores (also referred to as graphics units) (e.g., 105 or 106), cache elements, computation elements, voltage regulator (VR) phases, input/output (I/O) interfaces (e.g., serial links, DDR memory channels), and their controllers, network controllers, fabric controllers, or any combination thereof. Functional units may be logical processors, which may be considered the processor cores themselves or threads executing on the processor cores. A thread of execution is the smallest sequence of programmed instructions that can be managed independently. Multiple threads can exist within the same process and share resources such as memory, while different processes usually do not share these resources. Functional units 102, 103, 105, 106 may or may not share caches, and they may implement message passing or shared memory inter-core communication methods on a communications interconnect (e.g., SFSB interface 140 described below). Homogeneous multi-core systems are systems with identical cores. Sometimes identical cores are also referred to as equivalent cores. Heterogeneous multi-core systems have cores that are not identical or disparate functional units. Just as with single-processor systems, cores in multi-core systems may implement architectures such as superscalar, multithreading, vector processing or the like. It should be noted that the embodiments described below are described in the context of an example multi-core system including multiple processor cores and multiple graphics cores for simplicity of description.

The computing system 100 is a multi-core system, which is a single computing component with multiple independent central processing units (CPUs), which are functional units 102, 103, 105, 106 that read and execute program instructions. The multi-core systems may implement multiprocessing in a single physical package. The computing system 100 also includes multiple graphics cores, which are configured to accelerate the building of images intended for output to a display.

The computing system 100 includes an execution unit 104 that is coupled to a system fabric side band (SFSB) interface 140. The functional units 102, 103, 105, 106 are also coupled to the SFSB interface 140. The SFSB interface 140 may be an on-chip interconnect fabric. In one embodiment, the SFSB interface 140 is the Intel® On-Chip System Fabric Side Band (IOSF SB) interface. In another embodiment, the Advanced Microcontroller Bus Architecture (AMBA) interconnect developed by ARM may be used. The computing system 100 may also include an execution unit 104 and microcode ROM to store microcode (e.g., non-volatile memory (NVM) 120), which when executed by the execution unit 104, is to perform algorithms for certain macroinstructions or handle complex scenarios. Execution unit 104 may include logic to perform integer and floating point operations. Here, microcode is potentially updateable to handle logic bugs/fixes for the functional units (e.g., processor cores 102 or 103). For one embodiment, execution unit 104 includes logic to handle a packed instruction set. By including the packed instruction set in the instruction set of a general-purpose processor core (e.g., 102), along with associated circuitry to execute the instructions, the operations used by many multimedia applications may be performed using packed data in the general-purpose processor to accelerate or execute more efficiently the multimedia applications.

The NVM device 120 is computer memory that can retain the stored information even when not powered. Examples of NVM include read-only memory, flash memory, hard disks or the like. The computing system 100 may also include volatile memory, such as in the form of random access memory (RAM) or registers. In one embodiment, the remapping tool 110 maps the functional units 102, 103, 105, 106 to contexts stored in registers 122 or in other memory like NVM 120, ROM, RAM, main memory, cache or the like. In one embodiment, the registers are in a register file or a bank of register files. The registers can be general-purpose registers or other special-purpose registers. For example, a normal x86 thread has a context associated with it (also referred to as x86 state) that can be stored in sixteen general purpose registers, thirty-two AVX3 registers, segment registers, MMX/x87 registers, control registers (CR1-CR3) debug registers, tens of model specific registers (MSRS) or the like. The context may also be stored using rename tables, translation lookaside buffer (TLB), thread identifiers, scratch pads for saving the context. The context may also be stored in main memory, RAM, ROM, NVM or the like.

In one embodiment, the remapping tool 110 is implemented in a power management unit (PMU) that governs power functions of the functional units 102, 103, 105, 106. The PMU may be an on-die microcontroller that has similar components to a computer, including firmware, software, memory, a CPU, I/O functions, timers, as well as analog-to-digital converters to receive measurements from sensors of the functional units 102, 103, 105, 106. In one embodiment, the PMU executes code, referred to as pcode. In another embodiment, the remapping tool 110 could be implemented as part of the pcode in the PMU. Alternatively, the remapping tool 110 can be implemented as hardware (e.g., circuitry, dedicated logic, programmable logic, microcode, etc.), firmware, software or any combination of the above in the computing system 100. In another embodiment, the remapping tool 110 is implemented in microcode executable by the execution unit 104. The remapping tool 110 can use a mapping table 124 that maps contexts, such as those stored in registers 122, to the functional units 102, 103, 105, 106 as described herein. In some embodiments, the remapping tool 110 communicates with BIOS 130 of the computing system 100 to identify the functional units 102, 103, 105, 106.

In one embodiment, the remapping tool 110 intercept an operation to access a remote context of a first functional unit (e.g., 102) that is taken offline. The contexts of the functional units are considered off-core contexts in order to allow the functional units to be taken offline and maintain context remotely from the offline core. The remapping tool 110 determines that the first functional unit (e.g., 102) is remapped to a second functional unit (e.g., 105) using the mapping table 124. In one embodiment, the first functional unit 102 and the second functional unit 105 are heterogeneous functional units. For example, one may be a processor core and another may be a graphics core. For another example, one may be a thread executing on a processor core (102) and the other a second processor core (103). The remapping tool 110 remaps a functional unit identifier (FID) to a remapped FID when the first functional unit (e.g., 102) is remapped to the second functional unit (e.g., 105). The remapping tool 110 causes the operation to be performed to access the remote context that is remapped to the second functional unit. In other embodiments, the remapping tool 110 can remap homogeneous functional units. Additional details of some embodiments of the remapping tool 110 are described below with respect to FIGS. 2-6.

The components of FIG. 1 can reside on "a common carrier substrate," such as, for example, an integrated circuit ("IC") die substrate, a multi-chip module substrate or the like. Alternatively, the computing system 100 may reside on one or more printed circuit boards, such as, for example, a mother board, a daughter board or other type of circuit card. In other implementations, the main memory and the computing system 100 can reside on the same or different carrier substrates. In other implementations, the NVM 120 and the computing system 100 can reside on the same or different carrier substrates. In another embodiment, the execution unit 104 is integrated on a second integrated circuit die that is separate from the integrated circuit die on which the functional units 102, 103, 105, 106 reside, but may be in the same physical package. Also, as noted above, the NVM 120 may also reside on a separate integrated circuit die from the functional units 102, 103, 105, 106 or the execution unit 104.

Figure 2:
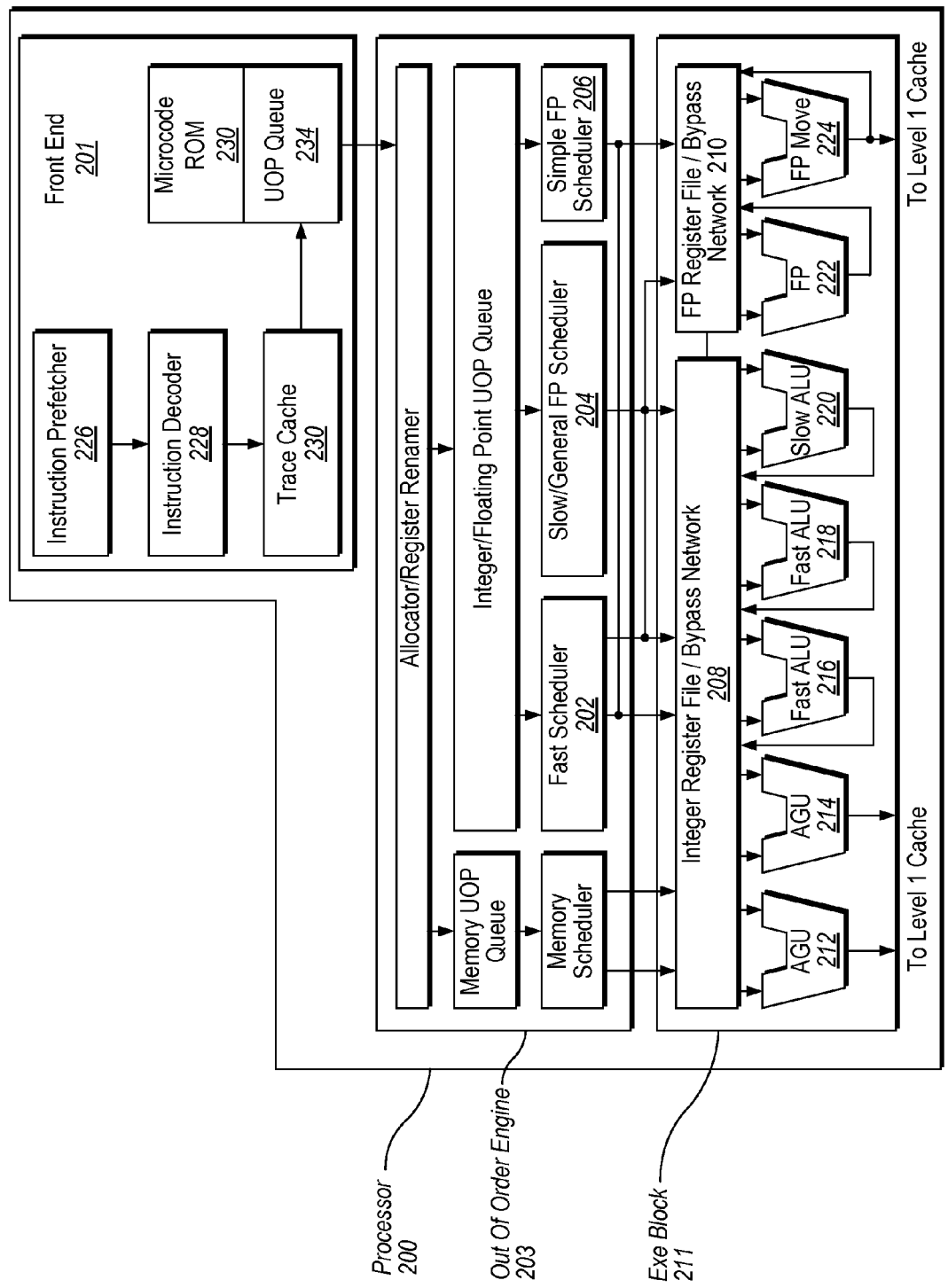
FIG. 2 is a block diagram of a processor according to one embodiment.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the microcode ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3:
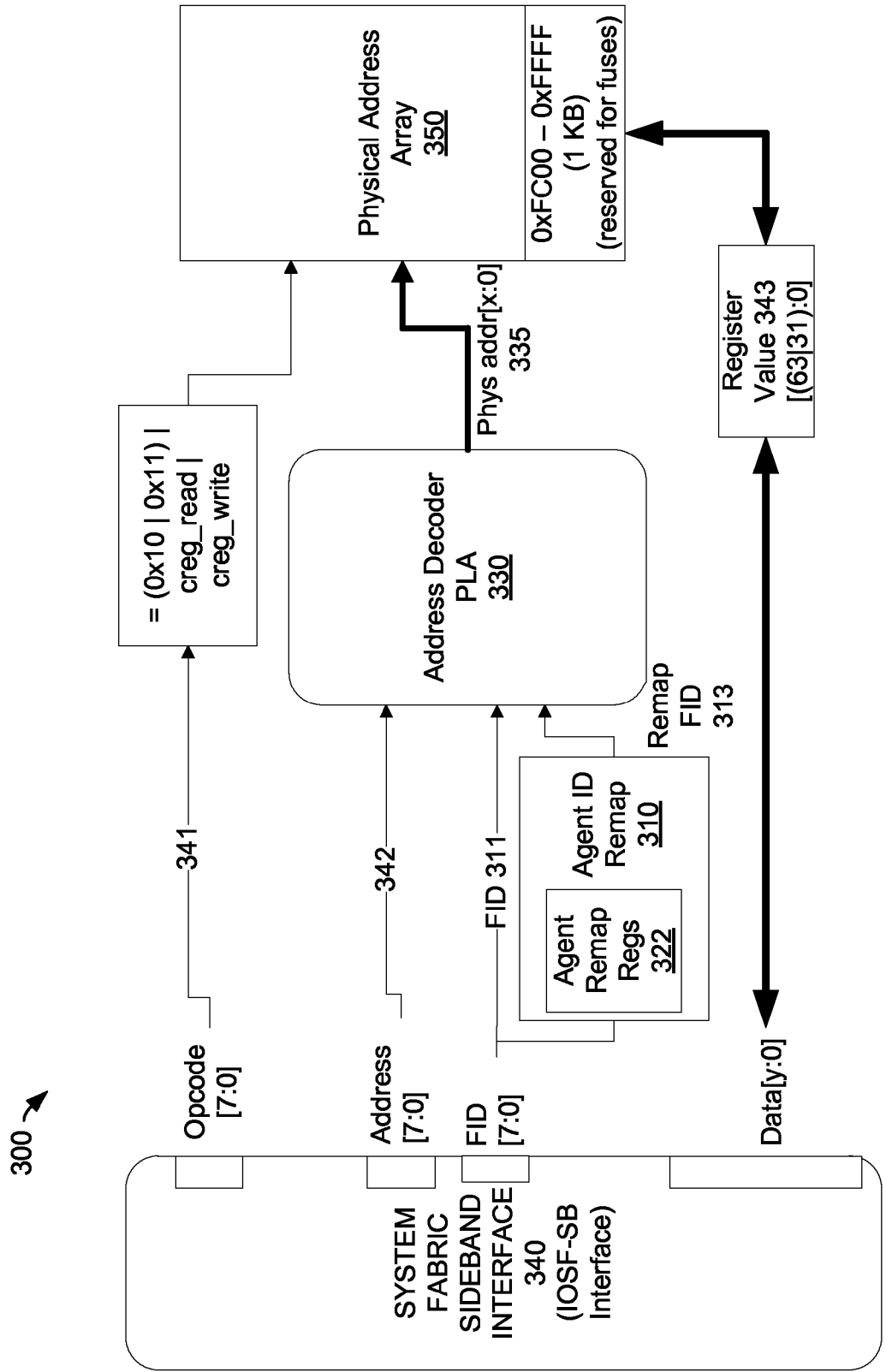
FIG. 3 is a block diagram of a remapping tool, an address decoder programmable logic array (PLA) between a system fabric side band (SFSB) interface and a physical address array according to one embodiment.

FIG. 3 is a block diagram of a remapping tool 310, an address decoder programmable logic array (PLA) 330 between a system fabric side band (SFSB) interface 340 and a physical address array 350 according to one embodiment. The SFSB interface 340 is an internal communication medium used to form a message network between different components of the system. In one embodiment, the SFSB interface 340 is the Intel® On-Chip System Fabric Side Band (IOSF SB) interface. Alternatively, other interfaces may be used. For example, the SFSB interface 340 receives a message or instruction with an operation to access a remote context of a functional unit from another component (not illustrated) and generates, or receives and resends, an opcode 341, a fabric address 342 and a functional unit identifier (FID) 311 that identifies which functional unit is an owner of the remote context for which the operation is to access. In one embodiment, the SFSB interface 340 receives the message from a power management agent as illustrated and described below with respect to FIG. 3. Alternatively, the SFSB interface 340 receives the message on a main data bus as described herein. The SFSB interface 340 sends a register value 343 when the operation is a write operation and receives a register value 343 from the physical address array 350 when the operation is a read operation. The opcode 341 specifies whether it is a register read operation or a register write operation and is input into the physical address array 350. Alternatively, other operations may be performed as would be appreciated by one of ordinary skill in the art having the benefit of this disclosure. The address decoder PLA 330 receives the fabric address 342 and the FID 311. The remapping tool 310 (also referred to as "agent ID remap") also receives the FID 311. The remapping tool 310, as described herein, determines whether the FID 311 has been remapped or not. When remapped, the remapping tool 310 outputs a remapped FID 313. The remapped FID 313 identifies the functional unit that replaced the original functional unit as identified in FID 311. In one embodiment, the remapping tool 310 uses agent remap registers 322 to determine whether FID 311 has been remapped to the remapped FID 313 or not. For example, a mapping table may be used to track the mappings between the functional units and the remote contexts. The address decoder PLA 330 also receives the remapped FID 313. The address decoder PLA 330 may include logic to determine when to discard FID 311 and use remapped FID 313. Alternatively, the FID 311 may not be input into the address decoder PLA 330 directly, and the address decoder PLA 330 receives one or the other but not both the FID 311 and remapped FID 313. Using either the FID 311 or the remapped FID 313, the address decoder PLA 330 generates a physical address 335 that identifies an address in the physical address array 350 that contains the register value. As described above, the operation may be a read operation in which the register value 343 is read from the physical address array 350 using the physical address 335 generated by the address decoder PLA 330. The operation may also be a write operation in which the register value 343 is input into the physical address array 350 using the physical address 335 generated by the address decoder PLA 330. In this way, the remapping tool 310 can allow access to the remote context of a functional unit that has been taken offline and remapped to a second functional unit. This may be done without making a copy of the remote context when the first functional unit is remapped to the second functional unit.

In one embodiment, the remapping tool 310 intercepts an operation to access a remote context of a first functional unit (FID 1) that is taken offline. The remapping tool 310 determines that the FID 1 is remapped to a second functional unit (remapped FID 2) using the agent remap registers 322 or a mapping table. In one embodiment, FID 1 and remapped FID 3 are heterogeneous functional units. The operation is performed on the remote context. In this embodiment, the remote context for the remapped functional unit does not change its physical address in the physical address array.

In one embodiment, the functional units are two heterogeneous processor cores. The remapping tool 310 presents the remote contexts of the two heterogeneous processor cores to look the same to an operating system executing on the computing system. In another embodiment, the remapping tool 310 is configured to switch owner identifiers (IDs) of the remote contexts of the two heterogeneous processor cores without making a copy of the remote contexts of the at least two heterogeneous processor cores. Of course, the remapping tool 310 may work with more than two heterogeneous processor cores. In another embodiment, presents a heterogeneous-replaced core of the two heterogeneous processor cores as being available to the operating system when the heterogeneous-replaced core is taken offline.

In one embodiment, the mapping table includes an entry that maps a first owner identifier of the heterogeneous-replaced core with a second owner identifier of a second heterogeneous core of the two heterogeneous processor cores that replaced the heterogeneous-replaced core. In another embodiment, the mapping table includes a state per entry that is marked as at least one of physically-accessed state or logically-accessed state. For example, the physically-access state may mean that if core X is replaced with core Y, a read by core X to the state A would return core X's state A value. The logically-accessed state may mean that if core X is replaced with core Y, a read by core X to the state B would return core Y's state B value. Additionally, since not all states may be mapped properly during pre-silicon manufacturing of the system, the remapping tool 310 may be used to dynamically switch between logically-accessed states. The remapping tool 310 can be used to allow a remapping of a computing core's remote context (off-core context) in order to make a heterogeneous-replaced core look like it is still available. An example of remote context that may be affected are residency timers used by software (e.g., operation system or an application executing on the operating system) to determine what operating state (e.g., C-state) to use. In another embodiment, the remapping tool 310 is configured to map functional units to allow software-agnostic context migration without making a copy of the remote context of the functional unit that is taken offline.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
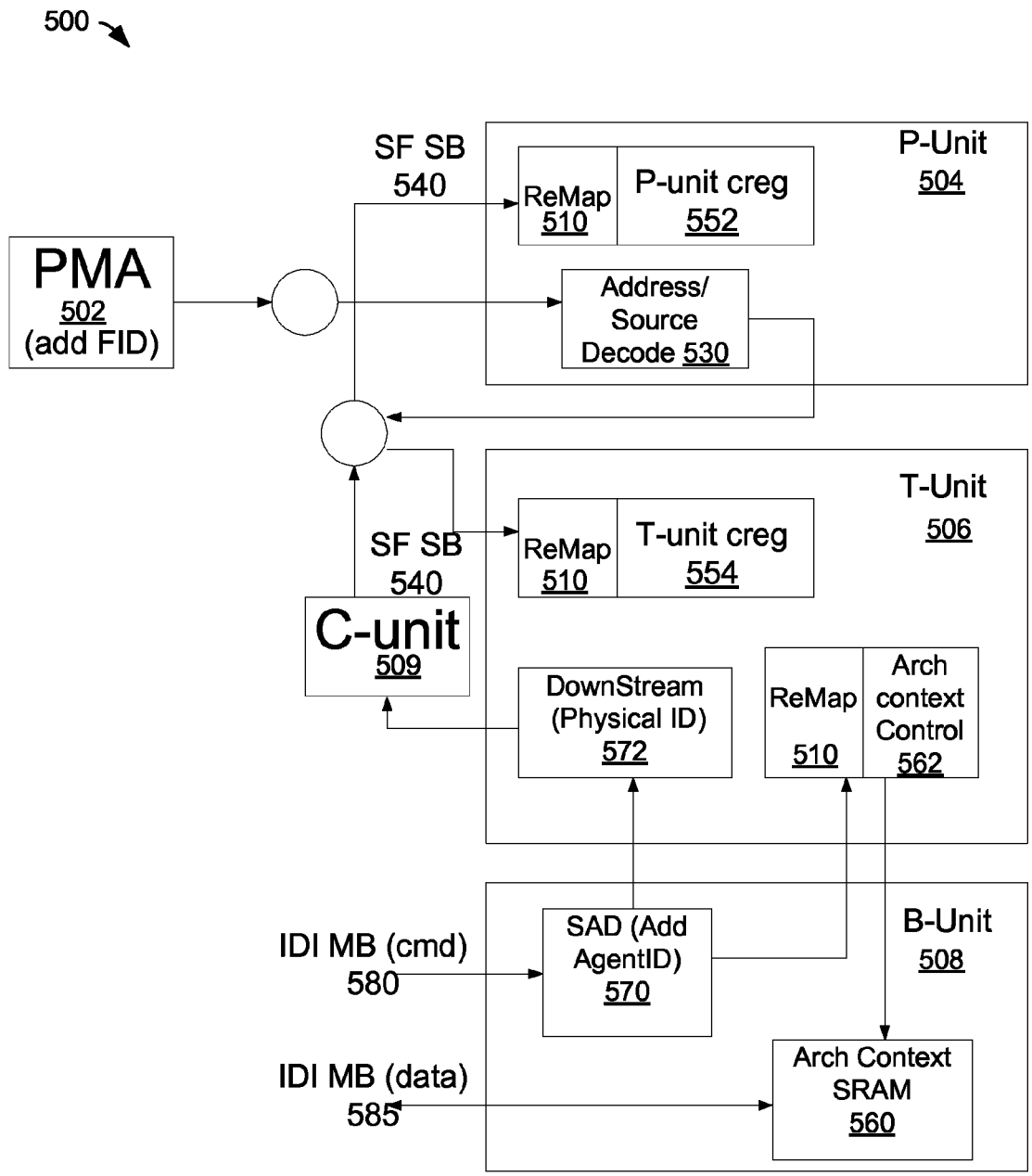
FIG. 5 is a block diagram illustrating a power manager agent (PMA) and multiple functional units that implements a remapping tool according to one embodiment.

FIG. 5 is a block diagram illustrating a power manager agent (PMA) 502 and multiple functional units 504-509 and that implements a remapping tool 510 according to one embodiment. The multiple functional units include a power control unit (P-unit) 504, an interrupt control unit (T-unit) 506, a bus unit (B-unit) 508, and a special (C-unit) 509 that handles commands received on a main bus to access remote context of the functional units (e.g., cores), instead of on the side band (SB) as described herein. The P-unit 504, T-unit 506, B-unit 508 and C-unit 509 are just example functional blocks that may be part of a multi-core system. In other embodiments, other functional blocks in a system on a chip (SOC) that may include one or more cores may be used. The PMA 502 may add a FID to the operation or thread and send it to the SFSB interface 540. The address decoder 530 of the P-unit 504 receives the incoming message (or instruction) from the SFSB interface 540, decodes the destination register and outputs the message back to the SFSB interface 540. If the destination register is the P-unit register 552 for the P-unit 504, the remapping tool 510 of the P-unit 504 receives the FID and determines if the FID has been remapped to a remapped FID or not to access the P-unit register 552. If the destination register is the T-unit register 554 of the T-unit 506, the remapping tool 510 of the T-unit 506 receives the FID and determines if the FID has been remapped to a remapped FID or not to access the T-unit register 554.

In another embodiment, the B-unit 508 is coupled to the main bus (MB) interface and receives commands 580 and data 585. In some embodiments, the command 580 is an operation to access one of the registers, such as P-unit register 552 or the T-unit register 554. In this embodiment, a source address decoder (SAD) 570 of the B-unit 508 receives the command 580. The SAD 570 decodes the command and adds a corresponding agent ID to the command. The SAD 570 sends the command downstream to a downstream block 572 of the T-unit 506. In this case, the downstream block 572 of the T-unit 506 receives the command and determines a physical address identifier and sends the command to the C-unit 509 that handles special commands via the main bus. The C-unit 509 sends the command on the SFSB interface 540 to be directed to the destination register as described above. In a further embodiment, the SAD 570 receives the command 580 and sends the command to the remapping tool 510 of T-unit 506 to determine if the FID has been remapped to a remapped FID. An architecture context control block 562 of the T-unit 506 can use the FID or remapped FID to access the corresponding physical address of the context stored in architecture context SRAM 560 of the B-unit 508. The architecture context SRAM 560 may be on-chip local memory, such as flash memory. The architecture context SRAM 560 may be a dedicated SRAM, a power management SRAM, a portion of memory that is protected from software, or any combination thereof. Alternatively, the architecture context SRAM 560 can be other types of memories and may be off-chip, on-chip or a combination thereof. In either case of receiving the command from the PMA 502 or on the main bus, the remapping tool 510 can determine if the FID has been remapped or not in order to access the remote context of a functional unit, even when the functional unit has been taken offline. In these embodiments, the remapping tool 510 can be implemented as hooks in each of the units 504 and 506 for commands from the PMA 502. The remapping tool can also be used in connection with the architecture context control 562 to access the architecture context SRAM 560 of the B-unit 508. The remapping tool can be integrated in other configurations, such as illustrated and described with respect to FIGS. 6A-6B.

Figure 6A:
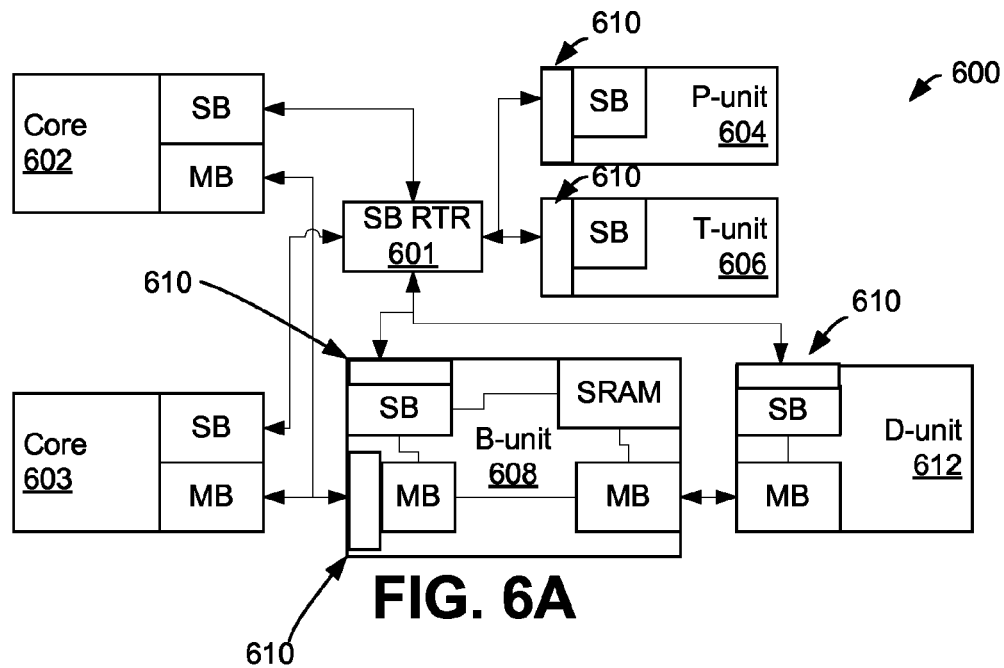
FIG. 6A is a block diagram illustrating a decentralized configuration of a remapping tool according to one embodiment.

FIG. 6A is a block diagram illustrating a decentralized configuration 400 of a remapping tool according to one embodiment. In this embodiment, the decentralized configuration 600 includes a side band router (SB RTR) 601 coupled to side band interfaces of cores 602, 603 (only two illustrated in the depicted embodiment). As described herein the cores 602, 603 may be heterogeneous cores. Main bus interfaces of the cores 602, 603 are coupled to a bus unit (B-unit) 608. Various instances of the remapping tool 610 are deployed at the SB interfaces of P-unit 604, T-Unit 606, B-Unit 608 and data unit (D-unit) 612 that controls path to main memory. Another instance of the remapping tool 610 can be deployed at the MB interface of the B-unit 608 as well. The remapping tool 610 intercepts operations on the SB interface (or MB interface as described herein), and determines if the FID is remapped to the remapped FID for purposes of access the remote context of the cores. For example, if the first core 602 is remapped to the second core 603 when the first core 602 is taken offline, then operations to the remote context of the first core 602 that is remapped to the second core 603 can be accessed. In some embodiments, the SB RTR 601 receives the commands from one of the cores and directs the commands to the appropriate unit. In other embodiments, the commands may be received on the MB at the B-unit 608 and handled accordingly.

Figure 6B:
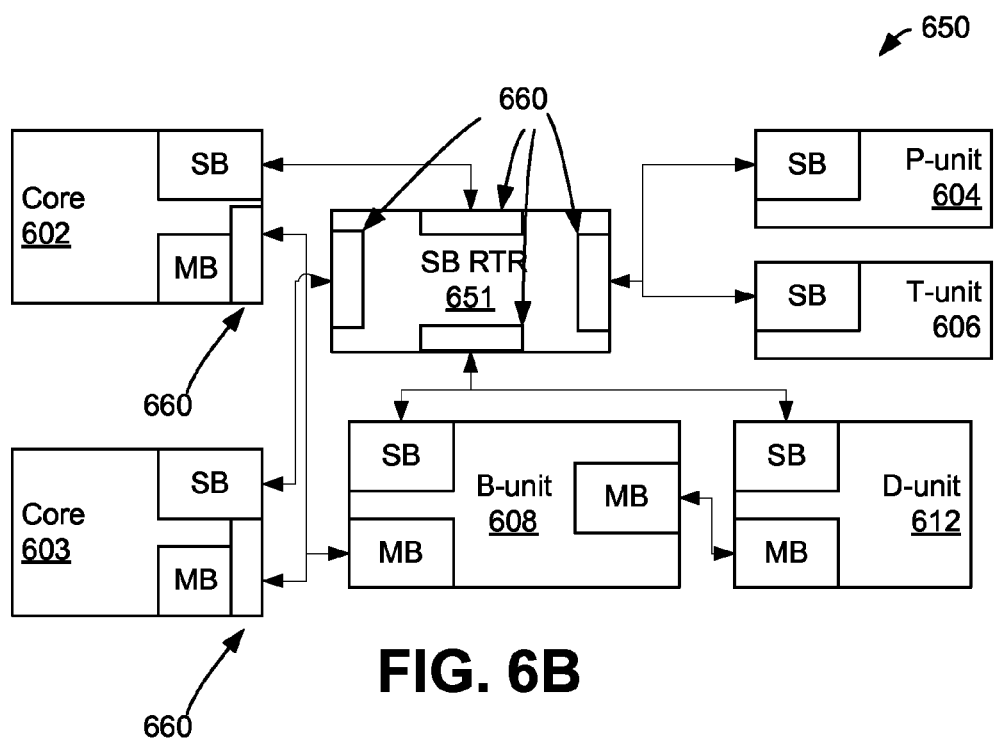
FIG. 6B is a block diagram illustrating a centralized configuration of a remapping tool according to one embodiment.

FIG. 6B is a block diagram illustrating another embodiment of a centralized configuration 650 of the remapping tool. In this embodiment, the centralized configuration 650 includes the same components of FIG. 6A as denoted with similar reference labels, except where specifically noted. The centralized configuration 650 includes multiple instances of the remapping tool 660 deployed at a SB RTR 651 in a centralized manner. The SB RTR 651 handles the remapping for the other units 604, 606 and 608. Additional instances of the remapping tool 660 are deployed at the MB interfaces of the cores 602, 603, instead of at the MB interface of the B-unit 608 as described in FIG. 6A. The remapping tool 660 intercepts operations at the SB RTR 651 and determines if the FID is remapped to the remapped FID for purposes of access the remote context of the cores 602, 603. In some embodiments, the SB RTR 601 receives the commands from one of the cores 602, 603 and directs the commands to the appropriate unit based on the remapping. In other embodiments, the commands may be remapped at the MB interface of the cores, instead of handled by the B-unit 608 as described above.

Figure 7:
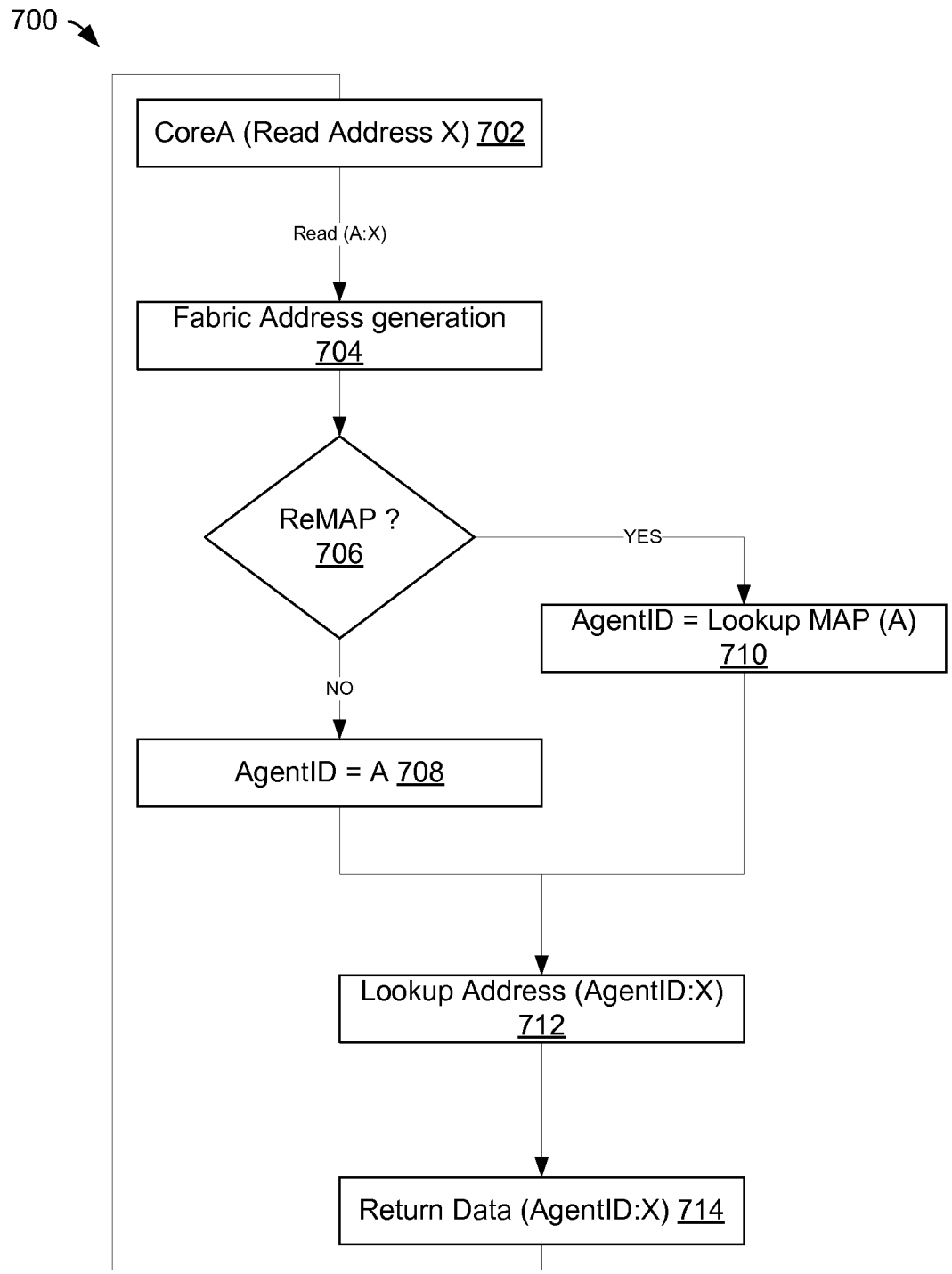
FIG. 7 is a flow diagram illustrating a method of remapping heterogeneous functional units of an integrated circuit die according to one embodiment.

FIG. 7 is a flow diagram illustrating a method 700 of remapping heterogeneous functional units of an integrated circuit die according to one embodiment. Method 700 may be performed by processing logic that may comprise hardware (e.g., circuitry, dedicated logic, programmable logic, microcode, etc.), software (such as instructions run on a processing device), firmware or a combination thereof. In one embodiment, method 700 is performed by computing system 100, and more specifically execution unit 104 of FIG. 1. In another embodiment, the method 700 is performed by remapping tool 110, 310, 510, 610, 660 as described herein. Alternatively, other components of the computing system 100 may perform some or all of the operations of the method 700.

Referring to FIG. 7, the method 700 begins by the processing logic receives an operation to read address X corresponding to Core A (block 702). The processing logic generates a fabric address corresponding to the read address X (block 704) and determines if the core A has been remapped (block 706). If it is not remapped, the processing logic sets the agent ID (also referred to herein as FID) to A (block 708). However, if at block 706 it is determined that core A is remapped, the processing logic performs a lookup in a mapping table for core A to define the agent ID (also referred to herein as remapped FID) (block 710). For example, core A may be remapped to core B. In this case, the agent ID is B. The processing logic performs a lookup address operation with the agent ID (A or B) for read address X based on the operations 706, 708, and 710 (block 712). The processing logic returns the data corresponding to the address X (block 714) and returns to block 702. The processing logic can perform the method 700 for write operations, as well as other operations. However, when performing the write operation, a data value is written to the corresponding X address.

Figure 8:
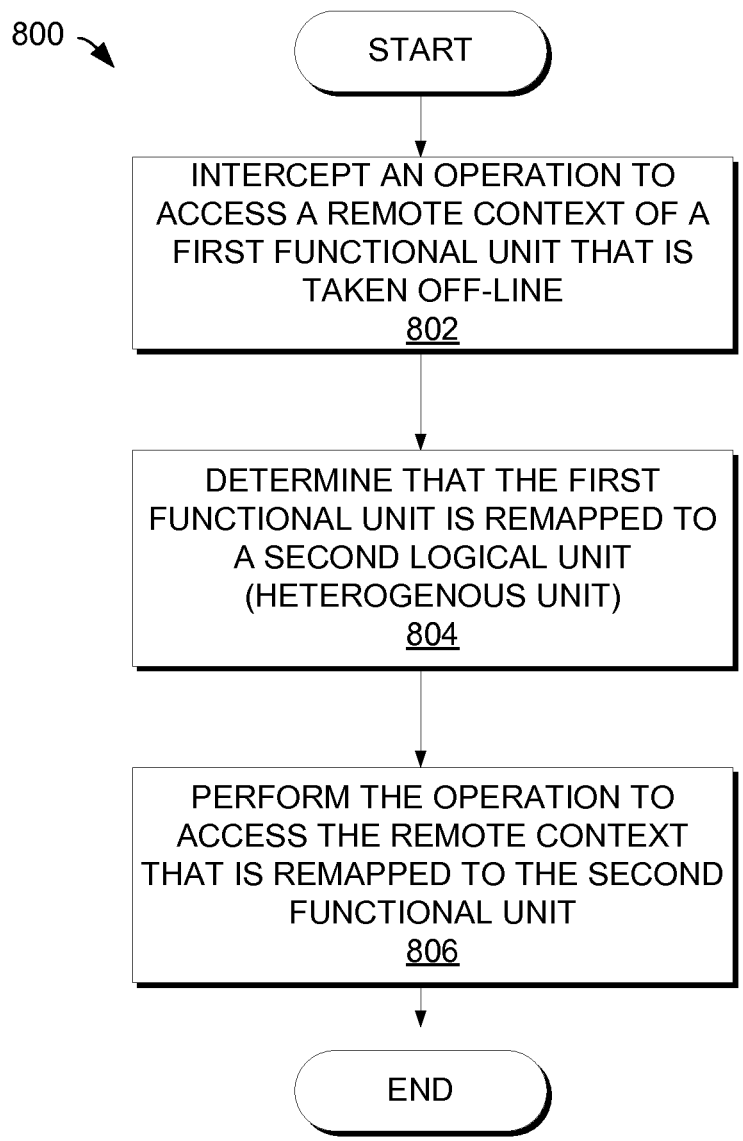
FIG. 8 is a flow diagram illustrating a method of remapping functional units of an integrated circuit die according to another embodiment.

FIG. 8 is a flow diagram illustrating a method of remapping functional units of an integrated circuit die according to another embodiment. Method 800 may be performed by processing logic that may comprise hardware (e.g., circuitry, dedicated logic, programmable logic, microcode, etc.), software (such as instructions run on a processing device), firmware or a combination thereof. In one embodiment, method 800 is performed by computing system 100, and more specifically execution unit 104 of FIG. 1. In another embodiment, the method 800 is performed by remapping tool 110, 310, 510, 610, 660 as described herein. Alternatively, other components of the computing system 100 may perform some or all of the operations of the method 800.

Referring to FIG. 8, the method 800 begins by the processing logic intercepting an operation to access a remote context of a first functional unit that is taken offline (block 802). The processing logic determines that the first functional unit is remapped to a second logical unit (heterogeneous unit) (block 804). The operation is performed to access the remote context that is remapped to the second functional unit since the first functional unit is taken offline (block 806), and the method 800 ends.

In another embodiment, the operation includes a functional unit identifier (FID). The processing logic performs a lookup operation in a mapping table that maps remote contexts of functional units to the functional units. The lookup operation returns a remapped FID for the second functional unit. In a further embodiment, the processing logic receives an address of the operation and at least one of the FID or remapped FID (based on whether it is remapped). The processing logic decodes the address of the operation and outputs a physical address for the remote context based on at least one of the FID or the remapped FID.

In another embodiment at block 802, the processing logic intercepts the FID at block 802 and, at block 804, determines whether the first functional unit is remapped to the second functional unit using the mapping table. At block 804, the processing logic uses the remapped FID for address decoding when the first functional unit is remapped to the second functional unit and uses the FID for address decoding when the first functional unit is not remapped to the second functional unit. As described herein the functional units may be heterogeneous processor cores, heterogeneous threads executable by the processor cores, heterogeneous graphics cores, heterogeneous cores (e.g., one processor core and another graphics core), or the like.

In one embodiment, when there are two (or more) heterogeneous processor cores, the processing logic presents the remote contexts of the two heterogeneous processor cores to look the same to an operating system executing on the computing system. In another embodiment, the processing logic switches owner identifiers (IDs) of the remote contexts of the two heterogeneous processor cores without making a copy of the remote contexts of the at least two heterogeneous processor cores. In another embodiment, the processing logic presents a heterogeneous-replaced core of the at least two heterogeneous processor cores as being available to an operating system executing on the computing system when the heterogeneous-replaced core is taken offline. In a further embodiment, the processing logic maps a first owner identifier of the heterogeneous-replaced core with a second owner identifier of a second heterogeneous core that replaced the heterogeneous-replaced core. In another embodiment, the processing logic remaps the remote context of the first functional unit to the second functional unit to allow software-agnostic context migration without making a copy of the remote context of the first functional unit.

In another embodiment, the processing logic marks a state per entry of the mapping table as at least one of physically-accessed state or logically-accessed state as described herein.

Figure 9:
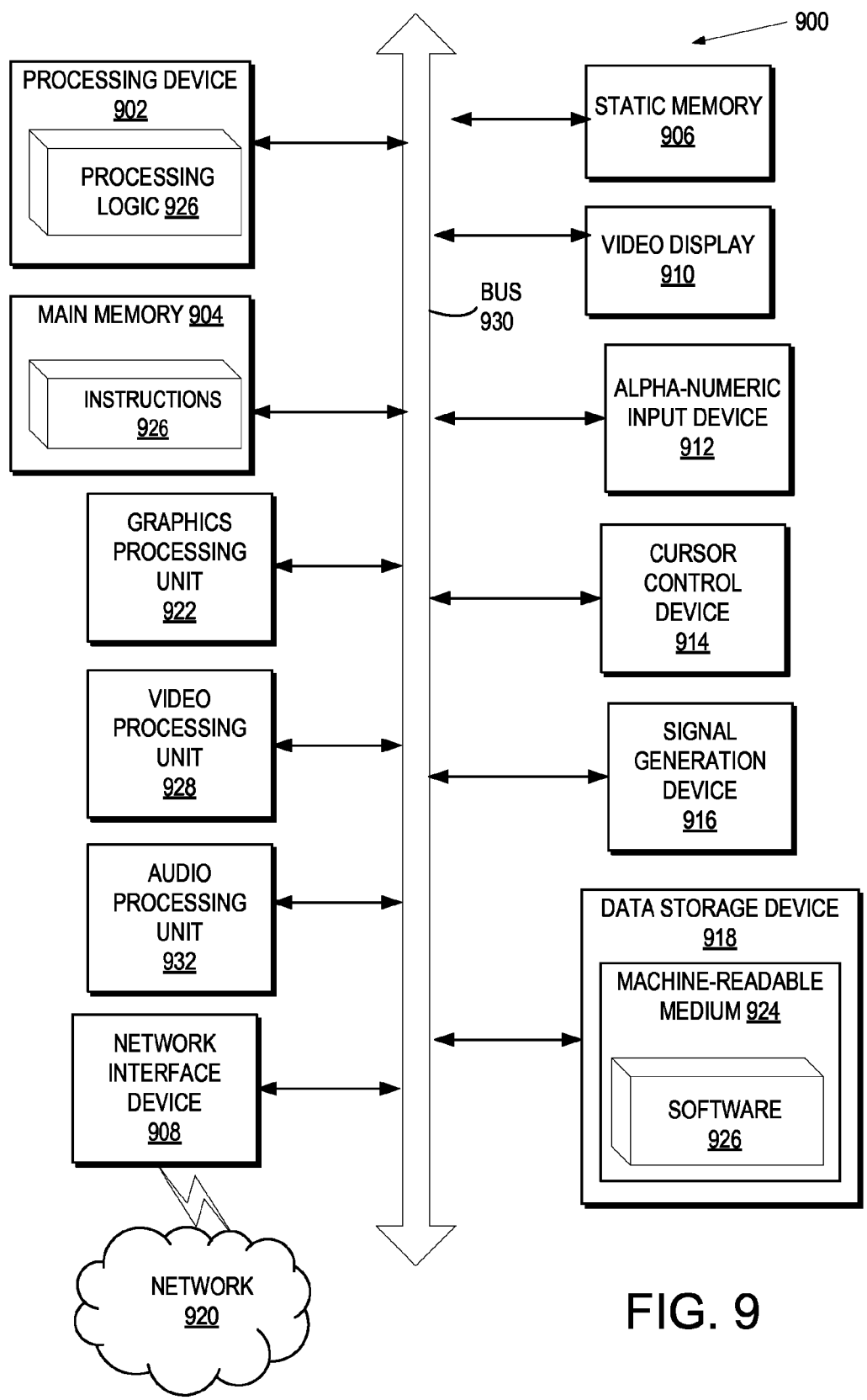
FIG. 9 illustrates a diagrammatic representation of a machine in the example form of a computing system within which a set of instructions may be executed for causing the computing system to perform any one or more of the methodologies discussed herein.

FIG. 9 illustrates a diagrammatic representation of a machine in the example form of a computing system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 900 includes a processing device 902, a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. In one embodiment, processing device 902 may include one or processing cores. The processing device 902 is configured to execute the processing logic 926 for performing the operations discussed herein. In one embodiment, processing device 902 is the same as computing system 100 of FIG. 1 that implements remapping tool 110. Alternatively, the computing system 900 can include other components as described herein.

The computing system 900 may further include a network interface device 908 communicably coupled to a network 920. The computing system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a signal generation device 916 (e.g., a speaker), or other peripheral devices. Furthermore, computing system 900 may include a graphics processing unit 922, a video processing unit 928 and an audio processing unit 932. In another embodiment, the computing system 900 may include a chipset (not illustrated), which refers to a group of integrated circuits, or chips, that are designed to work with the processing device 902 and controls communications between the processing device 902 and external devices. For example, the chipset may be a set of chips on a motherboard that links the processing device 902 to very high-speed devices, such as main memory 904 and graphic controllers, as well as linking the processing device 902 to lower-speed peripheral buses of peripherals, such as USB, PCI or ISA buses.

The data storage device 918 may include a computer-readable storage medium 924 on which is stored software 926 embodying any one or more of the methodologies of functions described herein. The software 926 may also reside, completely or at least partially, within the main memory 904 as instructions 926 and/or within the processing device 902 as processing logic 926 during execution thereof by the computing system 900; the main memory 904 and the processing device 902 also constituting computer-readable storage media.

The computer-readable storage medium 924 may also be used to store instructions 926 utilizing the remapping tool 110, such as described with respect to FIGS. 1-4B and/or a software library containing methods that call the above applications. While the computer-readable storage medium 924 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Figure 10:
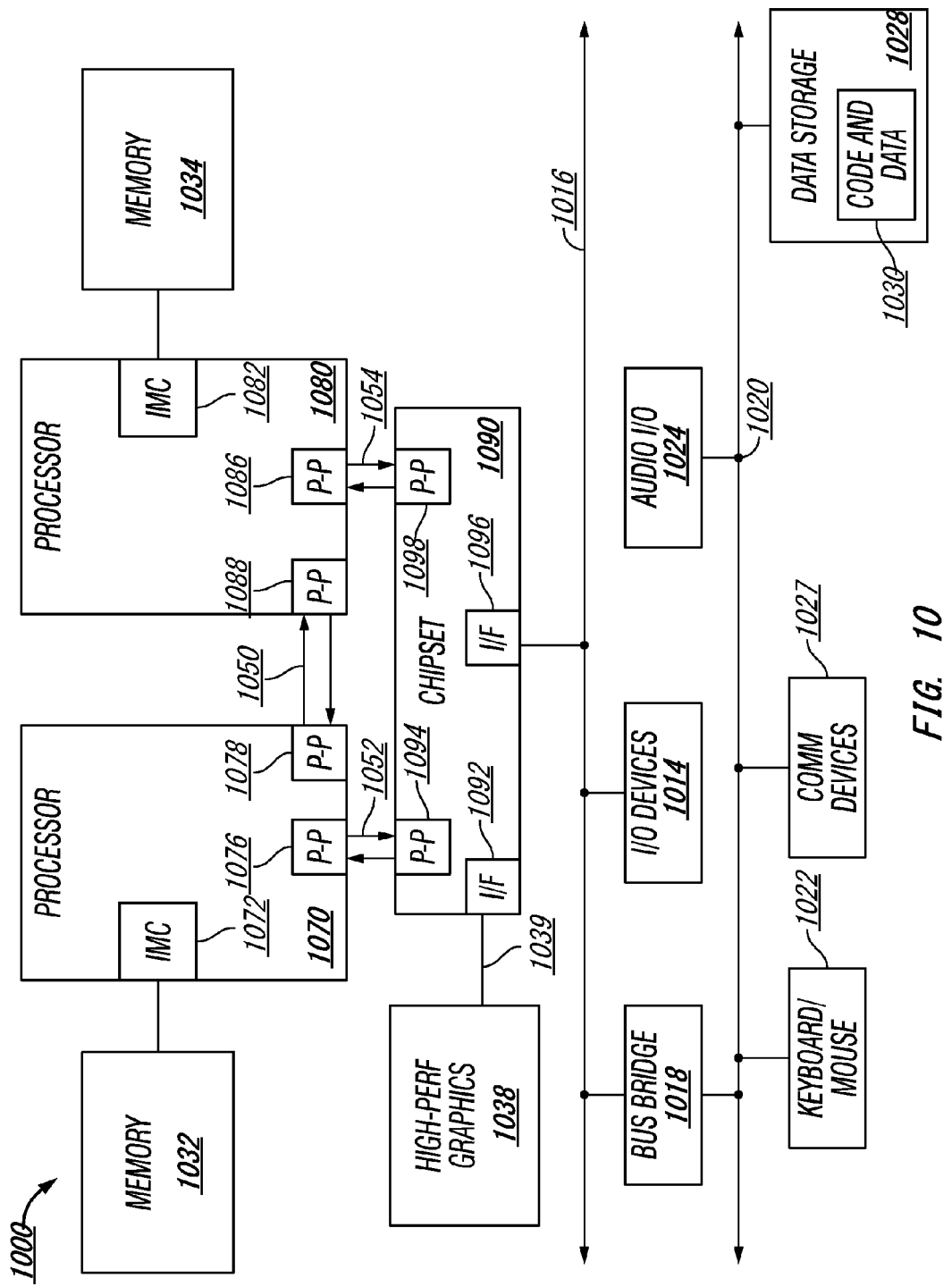
FIG. 10 is a block diagram of a computer system according to one embodiment.

Referring now to FIG. 10, shown is a block diagram of a second system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the computing systems described herein.

While shown with two processors 1070, 1080, it is to be understood that the scope of the present disclosure is not so limited. In other embodiments, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 may be coupled to first bus 1016, along with a bus bridge 1018 which couples first bus 1016 to a second bus 1020. In one embodiment, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to second bus 1020. Note that other architectures are possible. For example, instead of the point-to-point architecture of FIG. 10, a system may implement a multi-drop bus or other such architecture.

Figure 11:
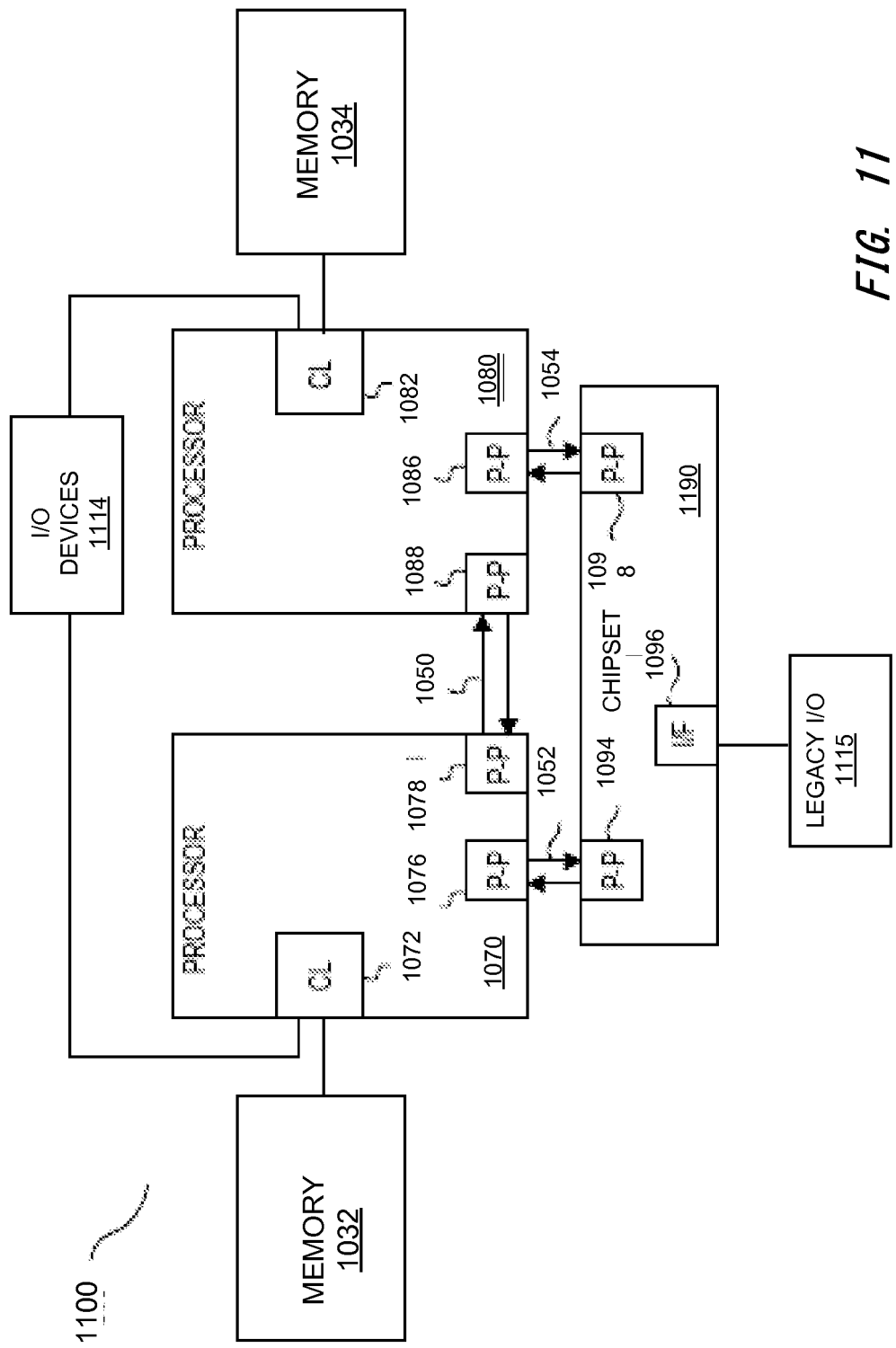
FIG. 11 is a block diagram of a computer system according to one embodiment.

Referring now to FIG. 10, shown is a block diagram of a third system 1000 in accordance with an embodiment of the present invention Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1170, 1180 may include integrated memory and I/O control logic ("CL") 1172 and 1182, respectively. For at least one embodiment, the CL 1172, 1182 may include integrated memory controller units such as that described above in connection with FIG. 10. In addition. CL 1172, 1182 may also include I/O control logic. FIG. 11 illustrates that the memories 1132, 1134 are coupled to the CL 1172, 1182, and that I/O devices 1114 are also coupled to the control logic 1172, 1182. Legacy I/O devices 1115 are coupled to the chipset 1190.

The following examples pertain to further embodiments.

Example 1 is a computing system comprising 1) a plurality of registers configured to store remote contexts of a plurality of functional units of the computing system; 2) a mapping table that maps the remote contexts to the plurality of functional units; and 3) an execution unit configured to execute a remapping tool to: intercept an operation to access a remote context of a first functional unit of the plurality of functional units that is taken offline; determine that the first functional unit is remapped to a second functional unit of the plurality of functional units using the mapping table, wherein the first functional unit and the second functional unit are heterogeneous functional units; and cause the operation to be performed to access the remote context that is remapped to the second functional unit.

In Example 2, the remapping tool of Example 1 is configured to remap a functional unit identifier (FID) to a remapped FID when the first functional unit is remapped to the second functional unit.

In Example 3, the subject matter of any one of Examples 1-2, further comprises an address decoder programmable logic array (PLA) configured to receive an address of the operation and at least one of the FID or remapped FID, wherein the address decoder PLA is configured to output a physical address for the remote context based on the at least one of the FID or remapped FID.

In Example 4, the subject matter of any one of Examples 1-3, further comprises a system fabric side-band (SFSB) interface configured to generate the address of the operation and the FID, wherein the remapping tool is configured to intercept the FID to determine whether the first functional unit is remapped to the second functional unit using the mapping table, wherein the remapping tool outputs the remapped FID to the address decoder PLA when the first functional unit is remapped to the second functional unit, and wherein the FID is output to the address decoder PLA when the first functional unit is not remapped to the second functional unit.

In Example 5, the subject matter of any of Examples 1-4, further comprises a physical address array for the plurality of registers, wherein the physical address array is configured to receive the physical address from the address decoder PLA and to return a first register value to the SFSB interface when the operation is a read operation, and wherein the physical address array is configured to receive the physical address from the address decoder PLA and a second register value from the SFSB interface when the operation is a write operation.

In Example 6, in the subject matter of any of Examples 1-5, the SFSB interface is configured to receive the operation from a power management agent (PMA).

In Example 7, in the subject matter of any of Examples 1-6 the remapping tool is integrated into microcode executable by the execution unit.

In Example 8, the subject matter of any of Examples 1-7, further comprises a register file comprising the plurality of registers.

In Example 9, the subject matter of any of Examples 1-8, further comprises a bank of register files comprising the plurality of registers.

In Example 10, in the subject matter of any of Examples 1-9, the plurality of registers comprises a plurality of general-purpose registers.

In Example 11, in the subject matter of any of Examples 1-10, at least one of the plurality of functional units is a processor core.

In Example 12, in the subject matter of any of Examples 1-11, at least one of the plurality of functional units is a thread executable by a processor core.

In Example 13, in the subject matter of any of Examples 1-12, the plurality of functional units comprises at least two heterogeneous processor cores, and wherein the remapping tool is configured to present the remote contexts of the at least two heterogeneous processor cores to look the same to an operating system executing on the computing system.

In Example 14, in the subject matter of any of Examples 1-13, the remapping tool is configured to switch owner identifiers (IDs) of the remote contexts of the at least two heterogeneous processor cores without making a copy of the remote contexts of the at least two heterogeneous processor cores.

In Example 15, in the subject matter of any of Examples 1-14, the plurality of functional units comprises at least two heterogeneous processor cores, and wherein the remapping tool is configured to present a heterogeneous-replaced core of the at least two heterogeneous processor cores as being available to an operating system executing on the computing system when the heterogeneous-replaced core is taken offline.

In Example 16, in the subject matter of any of Examples 1-15, the mapping table comprises an entry that maps a first owner identifier of the heterogeneous-replaced core with a second owner identifier of a second heterogeneous core of the at least two heterogeneous processor cores that replaced the heterogeneous-replaced core.

In Example 17, in the subject matter of any of Examples 1-16, the mapping table comprises a state per entry that is marked as at least one of physically-accessed state or logically-accessed state.

In Example 18, in the subject matter of any of Examples 1-17, at least one of the remote contexts comprise residency timers used by an operating system executing on the computing system to determine which operating state to use.

In Example 19, in the subject matter of any of Examples 1-18, the remapping tool is configured to map the first functional unit to the second functional unit to allow software-agnostic context migration without making a copy of the remote context of the first functional unit.

Various embodiments may have different combinations of the structural features described above. For instance, all optional features of the computing system described above may also be implemented with respect to the method or process described herein and specifics in the examples may be used anywhere in one or more embodiments.

Example 20 is an method comprising 1) intercepting an operation to access a remote context of a first functional unit of a plurality of functional hardware units of a computing system, wherein the first functional unit is taken offline; 2) determining that the first functional unit is remapped to a second functional unit of the plurality of functional hardware units, wherein the first functional unit and the second functional unit are heterogeneous functional units; and 3) performing the operation to access the remote context that is remapped to the second functional unit.

In Example 21, in the subject matter of Example 20 the operation can optionally comprise a functional unit identifier (FID), and wherein the determining comprises performing a lookup operation in a mapping table that maps remote contexts of functional units of the computing system to the functional units, and wherein the lookup operation returns a remapped FID for the second functional unit.

In Example 22, subject matter of any of Examples 20-21 can optionally further comprise receiving at an address decoder programmable logic array (PLA) an address of the operation and at least one of the FID or remapped FID; decoding the address of the operation by the address decoder (PLA); and outputting from the address decoder PLA a physical address for the remote context based on at least one of the FID or the remapped FID.

In Example 23, in the subject matter of any of Examples 20-22, wherein the intercepting further comprises intercepting the FID, and the determining comprises: determining whether the first functional unit is remapped to the second functional unit using the mapping table; outputting the remapped FID to the address decoder PLA when the first functional unit is remapped to the second functional unit; and outputting the FID to the address decoder PLA when the first functional unit is not remapped to the second functional unit.

In Example 24, the subject matter of any of Examples 20-23 can optionally include a processor core for at least one of the plurality of functional units.

In Example 25, the subject matter of any of Examples 20-24 can optionally include a thread executable by a processor core for at least one of the plurality of functional units.

In Example 26, the subject matter of any of Examples 20-25 can optionally include a graphics core for at least one of the plurality of functional units.

In Example 27, in the subject matter of any of Examples 20-26 the plurality of functional units can optionally comprises at least two heterogeneous processor cores, and wherein the method further comprises presenting the remote contexts of the at least two heterogeneous processor cores to look the same to an operating system executing on the computing system.

In Example 28, in the subject matter of any of Examples 20-27 the plurality of functional units can optionally at least two heterogeneous processor cores, and wherein the method further switching owner identifiers (IDs) of the remote contexts of the at least two heterogeneous processor cores without making a copy of the remote contexts of the at least two heterogeneous processor cores.

In Example 29, in the subject matter of any of Examples 20-28 the plurality of functional units can optionally at least two heterogeneous processor cores, and wherein the method further comprises presenting a heterogeneous-replaced core of the at least two heterogeneous processor cores as being available to an operating system executing on the computing system when the heterogeneous-replaced core is taken offline.

In Example 30, the subject matter of any of Examples 20-29 can optionally comprise mapping a first owner identifier of the heterogeneous-replaced core with a second owner identifier of a second heterogeneous core of the at least two heterogeneous processor cores that replaced the heterogeneous-replaced core.

In Example 31, the subject matter of any of Examples 20-30 can optionally comprise marking a state per entry of the mapping table as at least one of physically-accessed state or logically-accessed state.

In Example 32, the subject matter of any of Examples 20-31 can optionally comprise remapping the remote context of the first functional unit to the second functional unit to allow software-agnostic context migration without making a copy of the remote context of the first functional unit.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 33 is a non-transitory, computer-readable storage medium including instructions that, when executed by a processor, cause the processor to perform the method of Examples 20-32.

Example 34 is a system comprising an integrated circuit die; a peripheral device; and a chipset coupled to the peripheral device and the integrated circuit die, wherein the integrated circuit die comprises: 1) a plurality of registers configured to store remote contexts of a plurality of functional hardware units; 2) a mapping table that maps the remote contexts to the plurality of functional units; and 3) an execution unit configured to execute a remapping tool to: intercept an operation to access a remote context of a first functional unit of the plurality of functional units that is taken offline; determine that the first functional unit is remapped to a second functional unit of the plurality of functional units using the mapping table, wherein the first functional unit and the second functional unit are heterogeneous functional units; and cause the operation to be performed to access the remote context that is remapped to the second functional unit.

In Example 35, the subject matter of Example 34 can optionally comprise a non-volatile memory device coupled to the integrated circuit die.

In Example 35, the subject matter of Examples 34-35 can optionally include components of Examples 1-19.

Example 36 is an apparatus comprising: 1) a plurality of registers; 2) a plurality of functional units, wherein the plurality of registers are configured to store remote contexts of the plurality of functional units; 3) means for mapping the remote contexts to the plurality of functional units; 4) means for intercepting an operation to access a remote context of a first functional unit of the plurality of functional units that is taken offline; 5) means for determining that the first functional unit is remapped to a second functional unit of the plurality of functional units using the mapping table, wherein the first functional unit and the second functional unit are heterogeneous functional units; and 6) means for performing the operation to access the remote context that is remapped to the second functional unit.

In Example 37, the subject matter of Example 36 can optionally comprise means for remapping a functional unit identifier (FID) to a remapped FID when the first functional unit is remapped to the second functional unit.

Example 38 is an apparatus comprising: a memory; and a processor coupled to the memory, wherein the processor comprises a plurality of functional hardware units coupled together via a communication interconnect, wherein the processor configured to perform the method of any one of the Examples 20-32.

In Example 39, the subject matter of Example 38 optionally comprises a mapping table and is configured to execute microcode comprising a remapping tool.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A computing system comprising:
   a plurality of registers configured to store remote contexts of a plurality of functional units of the computing system, wherein the plurality of functional units comprises at least two heterogeneous processor cores;
   a mapping table that maps the remote contexts to the plurality of functional units; and
   an execution unit configured to execute a remapping tool to:
      present the remote contexts of the at least two heterogeneous processor cores to an operating system executing on the computing system;
      intercept an operation to access a remote context of a first functional unit of the plurality of functional units that is taken offline;
      determine that the first functional unit is remapped to a second functional unit of the plurality of functional units using the mapping table, wherein the first functional unit and the second functional unit are heterogeneous functional units, and
      cause the operation to be performed to access the remote context that is remapped to the second functional unit.

2. The computing system of claim 1, wherein the remapping tool is configured to remap a functional unit identifier (FID) to a remapped FID when the first functional unit is remapped to the second functional unit, wherein the computing system further comprises:
   an address decoder programmable logic array (PLA) configured to receive an address of the operation and at least one of the FID or remapped FID, wherein the address decoder PLA is configured to output a physical address for the remote context based on the at least one of the FID or the remapped FID; and
   a physical address array for the plurality of registers, wherein the physical address array is configured to receive the physical address from the address decoder PLA and to return a first register value to a system fabric side band (SFSB) interface when the operation is a read operation, and wherein the physical address array is configured to receive the physical address from the address decoder PLA and a second register value from the SFSB interface when the operation is a write operation.

3. The computing system of claim 2, further comprising the SFSB interface configured to generate the address of the operation and the FID, wherein the remapping tool is configured to intercept the FID to determine whether the first functional unit is remapped to the second functional unit using the mapping table, wherein the remapping tool outputs the remapped FID to the address decoder PLA when the first functional unit is remapped to the second functional unit, and wherein the FID is output to the address decoder PLA when the first functional unit is not remapped to the second functional unit.

4. The computing system of claim 1, wherein the remapping tool is integrated into microcode executable by the execution unit.

5. The computing system of claim 1, further comprising at least one of a register file comprising the plurality of registers or a bank of register files comprising the plurality of registers.

6. The computing system of claim 1, wherein at least one of the plurality of functional units is at least one of a processor core, a thread executable by the processor core, or a graphics core.

7. The computing system of claim 1, wherein the remapping tool is configured to present the remote contexts of the at least two heterogeneous processor cores to look the same to the operating system executing on the computing system.

8. The computing system of claim 1, wherein the remapping tool is configured to switch owner identifiers (IDs) of the remote contexts of the at least two heterogeneous processor cores without making a copy of the remote contexts of the at least two heterogeneous processor cores.

9. The computing system of claim 1, wherein the remapping tool is configured to present a heterogeneous-replaced core of the at least two heterogeneous processor cores as being available to the operating system executing on the computing system when the heterogeneous-replaced core is taken offline.

10. The computing system of claim 9, wherein the mapping table comprises an entry that maps a first owner identifier of the heterogeneous-replaced core with a second owner identifier of a second heterogeneous core of the at least two heterogeneous processor cores that replaced the heterogeneous-replaced core.

11. The computing system of claim 1, wherein at least one of the remote contexts comprise residency timers used by the operating system executing on the computing system to determine which operating state to use.

12. The computing system of claim 1, wherein the remapping tool is configured to map the first functional unit to the second functional unit to allow software-agnostic context migration without making a copy of the remote context of the first functional unit.

13. A method comprising:
   intercepting an operation to access a remote context of a first functional unit of a plurality of functional hardware units of a computing system, wherein the first functional unit is taken offline, and wherein the plurality of functional hardware units comprises at least two heterogeneous processor cores;
   presenting the remote contexts of the at least two heterogeneous processor cores to an operating system executing on the computing system;
   determining that the first functional unit is remapped to a second functional unit of the plurality of functional hardware units using a mapping table, wherein the mapping table maps the remote contexts to the plurality of functional units, wherein the first functional unit and the second functional unit are heterogeneous functional units; and
   performing the operation to access the remote context that is remapped to the second functional unit.

14. The method of claim 13, wherein the operation comprises a functional unit identifier (FID), and wherein the determining comprises performing a lookup operation in a mapping table that maps remote contexts of functional units of the computing system to the functional units, and wherein the lookup operation returns a remapped FID for the second functional unit.

15. The method of claim 14, further comprising:
   receiving at an address decoder programmable logic array (PLA) an address of the operation and at least one of the FID or remapped FID;

decoding the address of the operation by the address decoder (PLA); and outputting from the address decoder PLA a physical address for the remote context based on at least one of the FID or the remapped FID.

16. The method of claim 15, wherein the intercepting further comprises intercepting the FID, and wherein the determining comprises:

determining whether the first functional unit is remapped to the second functional unit using the mapping table;

outputting the remapped FID to the address decoder PLA when the first functional unit is remapped to the second functional unit; and outputting the FID to the address decoder PLA when the first functional unit is not remapped to the second functional unit.

17. The method of claim 13, wherein the method further comprises presenting the remote contexts of the at least two heterogeneous processor cores to look the same to the operating system executing on the computing system.

18. The method of claim 13, wherein the method further switching owner identifiers (IDs) of the remote contexts of the at least two heterogeneous processor cores without making a copy of the remote contexts of the at least two heterogeneous processor cores.

19. The method of claim 13, wherein the method further comprises presenting a heterogeneous-replaced core of the at least two heterogeneous processor cores as being available to the operating system executing on the computing system when the heterogeneous-replaced core is taken offline.

20. The method of claim 19, further comprising mapping a first owner identifier of the heterogeneous-replaced core with a second owner identifier of a second heterogeneous core of the at least two heterogeneous processor cores that replaced the heterogeneous-replaced core.

21. The method of claim 13, further comprising remapping the remote context of the first functional unit to the second functional unit to allow software-agnostic context migration without making a copy of the remote context of the first functional unit.

22. A non-transitory, computer-readable storage medium including instructions that, when executed by a computing system, cause the computing system to perform operations comprising:

intercepting an operation to access a remote context of a first functional unit of a plurality of functional hardware units of a computing system, wherein the first functional unit is taken offline, and wherein the plurality of functional hardware units comprises at least two heterogeneous processor cores;

presenting the remote contexts of the at least two heterogeneous processor cores to an operating system executing on the computing system;

determining that the first functional unit is remapped to a second functional unit of the plurality of functional hardware units using a mapping table, wherein the mapping table maps the remote contexts to the plurality of functional units, wherein the first functional unit and the second functional unit are heterogeneous functional units; and performing the operation to access the remote context that is remapped to the second functional unit.

23. The storage medium of claim 22, wherein the operation comprises a functional unit identifier (FID), and wherein the determining comprises performing a lookup operation in the mapping table, and wherein the lookup operation returns a remapped FID for the second functional unit.

24. A system comprising:

an integrated circuit die;

a peripheral device; and a chipset coupled to the peripheral device and the integrated circuit die, wherein the integrated circuit die comprises:

a plurality of registers configured to store remote contexts of a plurality of functional hardware units, wherein the plurality of functional units comprises at least two heterogeneous processor cores;

a mapping table that maps the remote contexts to the plurality of functional units; and an execution unit configured to execute a remapping tool to:

present the remote contexts of the at least two heterogeneous processor cores to an operating system executing on the computing system;

intercept an operation to access a remote context of a first functional unit of the plurality of functional units that is taken offline;

determine that the first functional unit is remapped to a second functional unit of the plurality of functional units using the mapping table, wherein the first functional unit and the second functional unit are heterogeneous functional units; and cause the operation to be performed to access the remote context that is remapped to the second functional unit.

25. The system of claim 24, further comprising a non-volatile memory device coupled to the integrated circuit die.

* * * * *